United States Patent [19]

Gustafsson et al.

[11] Patent Number: 5,800,658
[45] Date of Patent: Sep. 1, 1998

[54] METHOD AND MEANS BY MANUFACTURE OF A PRODUCT OF EXPANDED POLYMER

[75] Inventors: Per Erik Gustafsson, Skövde; Ulf Haggstam, Tranås, both of Sweden

[73] Assignee: Cirrus AB, Tranas, Sweden

[21] Appl. No.: 947,382

[22] Filed: Oct. 8, 1997

Related U.S. Application Data

[63] Continuation of Ser. No. 530,260, filed as PCT/SE94/00145, Feb. 22, 1994, published as WO94/20287, Sep. 15, 1994, abandoned.

[30] Foreign Application Priority Data

Mar. 1, 1993 [SE] Sweden ............... 9300672

[51] Int. Cl.$^6$ ............... C08J 9/24; C09J 5/06; B05D 3/06
[52] U.S. Cl. ............... 156/245; 152/272.2; 152/62.2; 264/22; 264/123; 264/DIG. 7
[58] Field of Search ............... 156/78, 245, 272.2, 156/62.2; 264/123, 337, DIG. 6, DIG. 7, 22

[56] References Cited

U.S. PATENT DOCUMENTS

| | | | |
|---|---|---|---|
| 2,428,771 | 10/1947 | Almy | 264/123 X |
| 3,166,615 | 1/1965 | Farrell | 264/123 X |
| 3,401,128 | 9/1968 | Terry | 264/123 X |
| 3,506,467 | 4/1970 | Ulrich . | |
| 3,640,787 | 2/1972 | Heller . | |
| 4,491,646 | 1/1985 | Gruber et al. . | |
| 4,639,383 | 1/1987 | Casey . | |
| 4,681,901 | 7/1987 | Gavin et al. . | |
| 4,749,595 | 6/1988 | Honda et al. . | |
| 4,828,882 | 5/1989 | Tsezos et al. . | |
| 4,886,011 | 12/1989 | Gelain . | |

FOREIGN PATENT DOCUMENTS

| | | |
|---|---|---|
| 2657554 | 6/1978 | Germany . |
| 3844664 | 4/1989 | Germany . |
| 2177940 | 2/1987 | United Kingdom . |
| 9114144 | 9/1991 | WIPO . |

OTHER PUBLICATIONS

Patent Abstract of Japan, vol. 13, No. 425, M–873, abstract of JP, A, 1–163006 (Kawata K.K.) 27 Jun. 1989.

Patent Abstract of Japan, vol. 13, No. 252, M–836, Abstract of JP, A, 1–58512 (Matsuji Nakagome), 6 Mar. 1989.

Patent Abstract of Japan, vol. 13, No. 22, M–786, Abstract of JP,A, 63–231908 (Matsuji Nakagome), 28 Sep. 1988.

*Primary Examiner*—Michael W. Ball
*Assistant Examiner*—Sam Chuan Yao
*Attorney, Agent, or Firm*—Cushman Darby & Cushman IP Group of Pillsbury Madison & Sutro

[57] ABSTRACT

The present invention is for method and means by the manufacture of a product of expanded polymer, by which is obtained a weight per unit volume which is essentially lower than that of homogeneous expanded material. The starting material according to the invention can be either a specifically manufactured starting material or scrap and recovered material. The pieces of expanded polymer are supplied in controlled quantities through a feeder to a space for the application of glue drops which are sprayed into the space from one or more dies. In the space the pieces of polymer are dried by means of micro-wave energy which is obtained from an energy generator and magnetrones. The dried pieces then are discarded from the space together with the air flow through the opening. By the manufacture of a product according to the invention one starts from the pieces with glue applied to them as described above. The pieces are put into a mould wherein they are pressed against each other. Thereupon the material is heated so that the glue becomes sticky and the pieces attach to each other. The heating is done by means of microwave energy which finds its way into and homogeneously heats the whole volume of material.

7 Claims, 1 Drawing Sheet

METHOD AND MEANS BY MANUFACTURE OF A PRODUCT OF EXPANDED POLYMER

This is a continuation of application No. Ser. No. 08/530,260, filed as PCT/SE94/00145 Feb. 22, 1994 published as WO94/20287 Sep. 15, 1994, which was abandoned upon the filling hereof.

BACKGROUND OF THE INVENTION

The present invention is for method and means by manufacture of a product of expanded polymer. This product can be either a moulded goods, i.e. get its final shape in connection with the manufacture or a semi-finished product which is given its final shape later on.

Expanded polymers comprise many different kinds of materials, such as foamed polymers, foamed rubbers and other expanded polymer. The invention, however, is primarily directed to so-called foamed polymer made from polyether.

Foamed polymers and other expanded polymers are used in many different fields, where their softness and elasticity is utilized. Examples of such fields are mattresses, pillows and different kinds of packagings and cushioning materials. The furniture industry uses different kinds of expanded polymers in different ways. The properties of the products of course depend on the choice of polymer, the crosslinking, additives and similar factors. A very essential factor is the weight per volume of the product, which is generally given as kilograms per cubic meter. This can be varied within given limits by the manufacture of the material, whereby the available technology sets a lower limit for the weight per volume unit. Freon compounds used to be used as blowing agents by the manufacture of polyether foamed polymer. The use of these compounds has now been discontinued which means that the lower limit for the attainable weight per unit volume of the manufactured polyether foam has been moved up to about 20 kg/m$^3$.

By the manufacture and further processing of expanded polymers there falls out large or small amounts of scrap, e.g. by cutting of shaped products. Hereto the scrap has found use when chopped to small pieces for filling of cushions or the like and also, as far as polyether is concerned, for manufacture of certain types of products after addition of further polyol, pressing and curing. The product is mainly insulating material, whereby, however, the weight per unit volume is considerably higher than the weight per unit volume of the starting material.

SUMMARY OF THE INVENTION

The present invention is for method and means by the manufacture of a product of expanded polymer, by which is obtained a weight per unit volume which is essentially lower than that of homogeneous expanded material. The starting material for the manufacture of a product according to the invention can be either a specially manufactured starting material or scrap and recovered material.

DETAILED DESCRIPTION OF THE INVENTION

Figure 1:
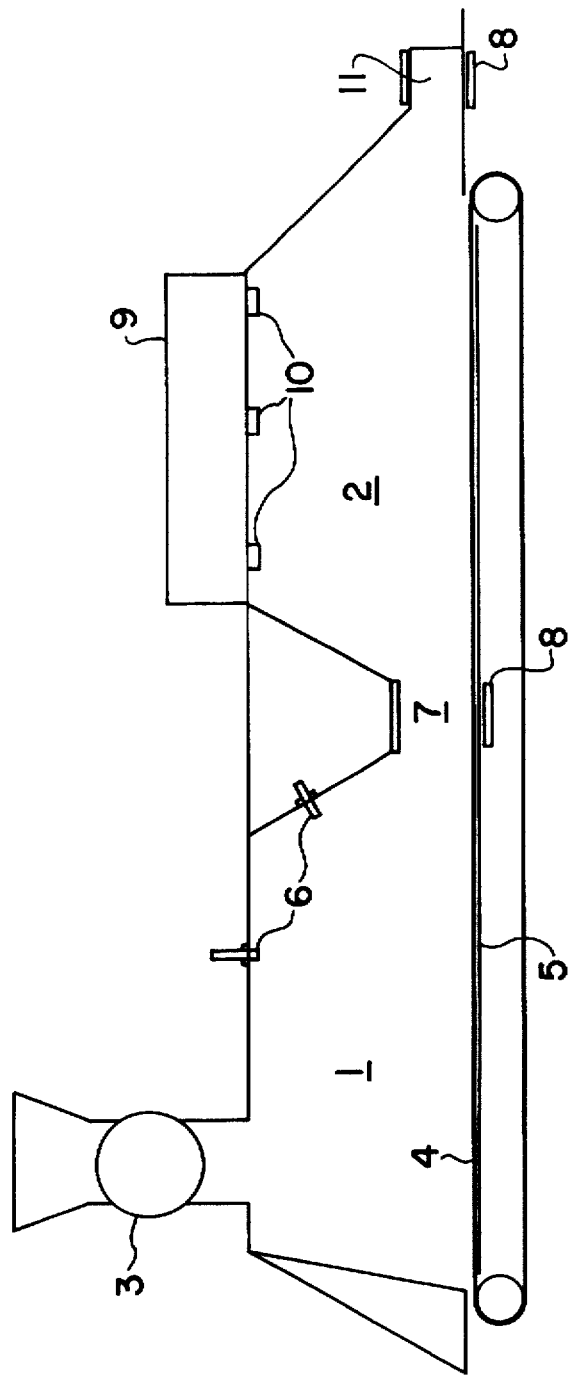
FIG. 1 shows a device for carrying out the process of the invention.

The method according to the invention uses as starting material small pieces of expanded polymer, preferably polyether foam polymer. Small drops of glue are applied to the surface of these pieces using a suitable equipment. This can be e.g. a somewhat tilted rotating net drum which contains a large number of pieces of the material. The water based glue is supplied through dies which it leaves in the form of very small droplets. When the correct amount of glue has been supplied, the drops are dried in a suitable way. It has hereby turned out that supplying the energy which is required for drying in the form of microwaves is superior to other methods as energy in this form is primarily taken up by the water in the glue drops and the drying can be completed without any noticeable increase of the temperature of the material. The dried pieces are not sticky at normal temperatures. The pieces can therefore be stored for a long time without adhereing to each other even if the material is compressed during storing.

Another device which is intended for use by the process described above is shown in the enclosed figure. The pieces of expanded polymer are supplied in controlled quantities through a feeder 3 to a space 1 for the application of glue drops which are sprayed into the space from one or more dies 6. The space 1 is delimited downwards by a perforated conveyer band 4 made from PTFE or other suitable material. The conveyer band is carried by a bottom plate 5 which is perforated at least over the major part of the surface under the space 1. By means not shown in the figure a controlled flow of air is blown or suctioned through the perforations of the bottom plate and the conveyer band. Hereby a pulsating air flow is obtained which is adjusted so that the pieces of polymer remain floating in the space 1. The air flow with the pieces of polymer then passes through a slit 7 into a second space 2. Also the conveyer band continues through the space 2, whereby it is carried by the bottom plate 5 which here has no perforations.

In the space 2 the pieces of polymer are dried by means of microwave energy which is obtained from a transmitter 9 and magnetrones 10. The dried pieces then are discarded from the space 2 together with the air flow through the opening 11. This device makes it possible to vary the applied amount of glue and the water content of the product carefully and within wide limits.

By the manufacture of a product according to the invention one starts from the pieces with glue applied-to them as described above. These pieces can be either freshly manufactured or be taken from a storage container. The pieces are put into some kind of mould wherein they are pressed against each other. Thereupon the material is heated so that the glue becomes sticky and the pieces adhere to each other.

The heating is done by means of microwave energy which finds its way into and homogenously heats the whole volume of material. The distribution of heat in the different materials (glue, foamed polymer) depends on the properties of the materials and on their content of water. Alternative methods for heating, such as e.g. blowing of hot air, would mean considerably higher temperatures at the air inlets and also considerably longer processing times; in both cases depending upon that expanded polymer is an insulating material and very poorly transfers heat or allows flow of heated air. In this way one obtains a connection between the parts at all points where there are glue droplets. This means that when the product is removed from the mould and the outer pressure is removed there is only a small volume expansion.

The method according to the invention makes it possible to manufacture products which retain their elasticity and have a weight per volume unit essentially lower than that of the starting material. Starting from polyether foam polymer with a normal weight per volume of 20–50 kg/m³ products with a low weight per volume can be made using the method of the invention. The decrease of the weight per volume can be up to 10 kg/m³ or more. In those cases when the starting material is scrap from other production or a recovered material which has been chopped into small pieces, the shape of these pieces is generally random. The shape of the pieces may, however, be controlled if they are produced directly for use with the method of the invention. The weight per volume of the finished product can to a certain degree be controlled by the shape of the pieces. In order to obtain a low weight per volume and other properties as desired of the product it has been found that it is suitable if the pieces at least in some direction have a triangular cross section. The pieces may also have the shape of short bands, e.g. 1–2 cm wide, 5–10 cm long and 3–7 mm thick.

Different kinds of glue may be used in connection with the invention. Primarily water based latex glues which may contain additions of acrylate or polyvinyl alcohol are used. The amount of glue which is applied can be varied within wide limits but normally the amount of glue is limited so that it forms individual discreet drops on the surface of the pieces. In certain applications larger amounts of glue are applied, e.g. in order to obtain a certain amount of closed pores in the material. In general one makes use of a glue with the property that it becomes sticky by increased temperature and then can bond together different components and when the temperature is lowered return to a non-sticky condition. For certain applications one uses glue types which can bond also to other kinds of materials. An example of such use is the manufacture of insulating board. In this case the pieces are supplied to a conveyer where they are laid out as a suitably thick layer and continuously pass through a microwave arrangement. In connection herewith a plastic film may be applied to one or both sides of the material. Such a plastic film serves as a bar for moisture in certain applications as insulating material and also as a delimiting surface for products. Instead of a plastic film one may use polyether board, paper or textile material.

Primarily only such glues are used, the bonding ability of which only depends upon the temperature. It is, however, also possible to use curing glues whereby the curing reactions can be initiated by an increase of the temperature.

We claim:

1. A method of manufacturing an expanded polymer material product comprising:

providing small pieces of expanded polymer, applying a water-based glue in droplet form to the surfaces of the pieces of expanded material, drying said pieces having said glue applied thereto using microwave energy, after said step of drying, placing the pieces into a mold and compressing the pieces against each other, and heating the material using microwave energy to bond the pieces together so that the weight per unit volume of the obtained product is lower than that of the pieces.

2. The method according to claim 1, wherein the weight per unit volume of the product is controlled by the compression of the pieces.

3. The method according to claim 2, wherein the pieces are compressed so that the weight per volume of the product is about half as much as the weight per unit volume of the homogeneous material.

4. The method according to claim 1, wherein heating takes place in an essentially closed mold.

5. The method according to claim 1, wherein the heating takes place continuously.

6. The method according to claim 5 wherein the heating takes place while the pieces of material are covered by a covering material which covers a substantial part of the product.

7. The method according to claim 6, wherein the covering material is bonded to the enclosed pieces of the material during heating.

* * * * *